United States Patent

Fleming et al.

[15] 3,656,665

[45] Apr. 18, 1972

[54] INERTIA RESPONSIVE APPARATUS FOR SUPPLYING FLUID MEDIUM UNDER PRESSURE

[72] Inventors: William T. Fleming, Boonton; Alfred J. Munn, Wayne, both of N.J.

[73] Assignee: Walter Kidde & Company, Inc., Belleville, N.J.

[22] Filed: Apr. 14, 1970

[21] Appl. No.: 28,309

[52] U.S. Cl. ....................222/500, 222/3, 137/38, 280/150 AB

[51] Int. Cl. ....................B60r 21/08, F16k 17/36

[58] Field of Search ....................222/3, 491, 495, 497, 500; 251/90; 137/38, 39; 280/150 AB

[56] References Cited

UNITED STATES PATENTS

| | | | |
|---|---|---|---|
| 1,799,914 | 4/1931 | Lemoine | 222/3 |
| 2,622,609 | 12/1952 | Moller | 137/38 |
| 3,105,506 | 10/1963 | Beeby | 137/38 |
| 3,216,466 | 11/1965 | Simko | 222/3 X |

*Primary Examiner*—Robert B. Reeves
*Assistant Examiner*—F. C. Handren
*Attorney*—Darby & Darby

[57] ABSTRACT

Apparatus for supplying fluid medium under pressure in response to a predetermined rate of change in velocity including a container of fluid medium under pressure and an inertia responsive valving arrangement positioned within the container. The container is provided with an outlet opening and a larger diameter second opening aligned therewith. A stepped hollow cylindrical valve member extends between the two openings and is pressure biased toward the second opening to overcome the friction of the seals at the openings. The valve member is held in the closed position by a ball locking arrangement provided at the second opening. An inertia sensitive mass is positioned within the hollow valve member to unlock the locking arrangement in response to a sudden change in the velocity of the container.

10 Claims, 2 Drawing Figures

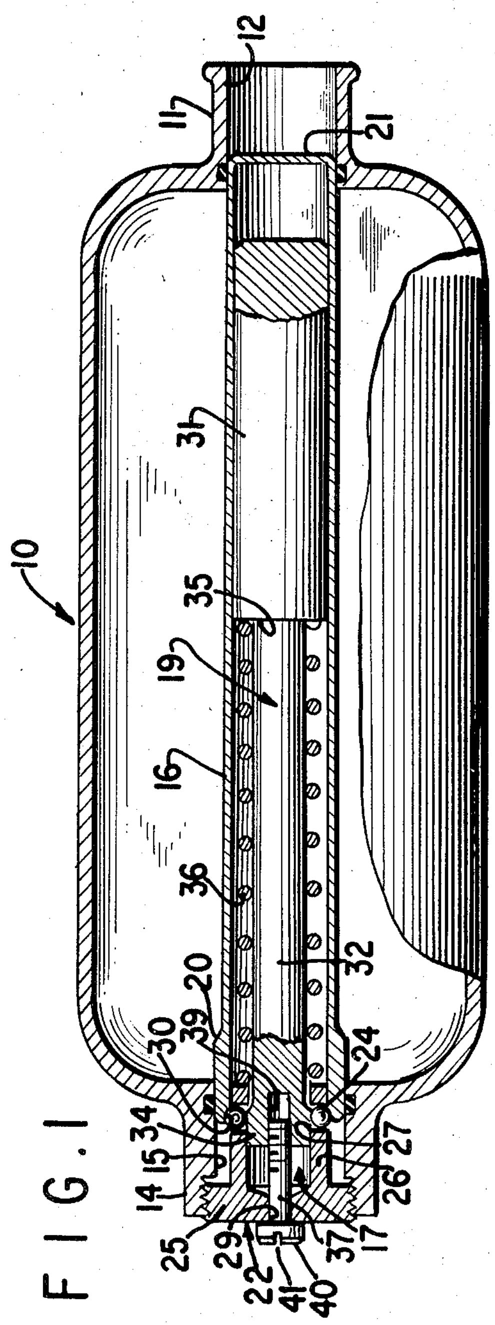
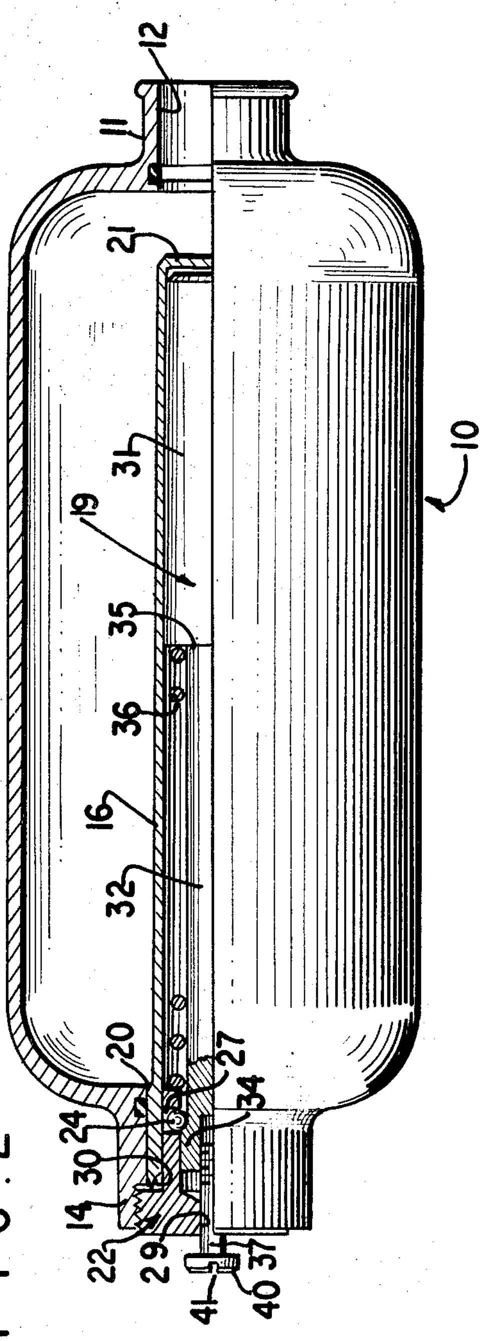
INVENTORS
WILLIAM T. FLEMING
ALFRED J. MUNN
BY
AGENT

INERTIA RESPONSIVE APPARATUS FOR SUPPLYING FLUID MEDIUM UNDER PRESSURE

CROSS REFERENCE TO RELATED APPLICATIONS

The present invention is a modification of the invention disclosed in U.S. application Ser. No. 862,687 of John Cirillo filed Oct. 1, 1969 and assigned to the assignee of the present application.

BACKGROUND OF THE INVENTION

The present invention relates to apparatus for supplying fluid medium under pressure, and, more particularly, to such apparatus which is placed in operation in response to a sudden change in the velocity of the apparatus.

In recent years a great deal of attention has been devoted to safety systems and devices for protecting the occupants of passenger vehicles, particularly automobiles. One type of system which is currently being given serious consideration employs an inflatable bag or envelope which is stored in a deflated condition, usually in front of the occupant (for example under the dashboard of an automobile). When the vehicle experiences very rapid deceleration such that the occupant would be thrown forward against the dash or windshield, gas stored under pressure is automatically released and the bag is inflated to restrain and cushion the occupant.

A system of this type must operate very quickly. The bag must be inflated in milliseconds after a sudden impact if the occupant is to be protected. The systems which have been previously proposed have employed electrically detonated explosive charges for rapidly releasing the stored gas. The explosive charge is connected to an electrical circuit which includes an inertia responsive electrical switch that closes in response to a predetermined rate of deceleration.

Although a number of these systems have been developed and successfully tested, they have not been put into general practice because of their high cost. The explosive valve, the inertia responsive switch, and the associated electrical circuit, which have been considered essential for fast operation, represent a substantial portion of this cost.

SUMMARY

Accordingly, it is an object of this invention to provide apparatus for supplying pressurized gas which is both low in cost and fast acting.

Another object is to provide such apparatus wherein the pressure vessel contains a fast acting inertia actuated valve.

Another object is to provide such apparatus which is easily and conveniently serviced.

The foregoing objects are accomplished by providing apparatus for supplying pressurized gas in response to a rapid change in velocity comprising a container of pressurized gas having an outlet opening and another opening aligned therewith, a valve member extending from the outlet into the other opening and formed with a piston surface so that the pressure within the container moves the valve member to open the outlet, means for locking the valve member in the closed position, and an actuating mass for rendering the locking means ineffective when the container experiences a sudden change in velocity.

BRIEF DESCRIPTION OF THE DRAWINGS

A preferred embodiment of the invention has been chosen for purposes of illustration and description, and is shown in the accompanying drawings, forming a part of the specification wherein:

FIG. 1 is a longitudinal sectional view of apparatus according to the present invention in its normal or unactuated condition.

FIG. 2 is a sectional view of the apparatus of FIG. 1 in the operated condition.

DESCRIPTION OF THE PREFERRED EMBODIMENT

Referring to FIG. 1 of the drawings, there is shown apparatus in accordance with the present invention which includes a container or pressure vessel 10 having a neck 11 defining an outlet opening 12 and a neck 14 defining a second opening 15, a hollow cylindrical valve member 16 extending between the openings 12 and 15, a locking arrangement 17 positioned in the neck 14, and an actuating mass 19 within the valve member 16.

The left end of the valve member 16 (as viewed in the drawings) is enlarged to provide a piston surface 20 to be acted upon by the pressure within the container 10. The piston surface 20 has an area in excess of that necessary to overcome the frictional resistance developed by the pressure seals provided in the necks 11 and 14. The opening 15 is of larger diameter than the opening 12 to receive the left end of the valve member. The right hand end of the valve member is closed by a wall 21 while the left end is open to receive the locking arrangement 17 and the mass 19.

The locking arrangement 17 includes a cage member 22 and a plurality of steel balls 24. The cage member has a body 25 threaded into the neck 14 and an annular flange 26 extending from the body toward the valve member. The flange 26 is provided with a plurality of openings 27 for receiving the balls 24. The body 25 is provided with an axial bore 29. The end of the valve member 16 is provided with an annularly extending arcuate recess 30 for contacting the balls 24.

The actuating mass 19 has an end section 31 which loosely fits within the valve member 16, an intermediate section 32 of a diameter significantly less than the inner diameter of the flange 26, and an end section 34 having a diameter only slightly less than the inner diameter of the flange. A shoulder 35 is formed at the junction of the sections 31 and 32. A coil spring 36 surrounds the section 32 and engages the shoulder 35 and the end of the flange 26. An adjusting screw 37 extends through the bore 29 in the cage member 17 and is threaded into a bore 39 provided in the end of the mass 19. A head 40 on the screw 37 engages the cage body 25 and is provided with a screwdriver slot 41 for adjusting the preload on the spring 36.

The container 10 is filled with gas under pressure through a separate valved fill port (not shown) of conventional design and is mounted within a vehicle, for example under the dashboard of an automobile. The container is mounted so that the neck 14 is pointing in the direction in which the vehicle is traveling.

In operation, when the vehicle experiences a sudden deceleration, for example as a result of a collision, the mass 19 moves to the left (with respect to the container 10) and the end section 34 moves out of registry with the openings 27. The balls 24 are then free to move inwardly and, as shown in FIG. 2, the pressure acting on the piston surface 20 forces the valve member 16 to the left, opening the outlet 12. The balls 24 are held in the inward position by the valve member and lock the mass 19 in the position shown in FIG. 2. The mass is thus prevented from rebounding which would tend to move the valve member toward the outlet 12. Upon movement of the valve member into the position of FIG. 2, the gas in the container rapidly discharges through the outlet opening 12, for example into an inflatable bag which will then deploy to restrain and protect a passenger of the vehicle.

The apparatus is reset by unscrewing the cage member 22 and withdrawing the valve member 16 and its contents. The valve member is then moved away from the cage member until the balls 24 are free to move into their outward position (shown in FIG. 1). The spring 36 will then move the mass 19 into its original position placing the balls in engagement with the recess 30 in the end of the valve member 16. This sub-assembly is then placed within the container and the container is pressurized.

It will be seen from the foregoing, that the present invention provides low cost and fast acting apparatus for supplying pressurized gas which contains an inertia actuated valve and is easily and conveniently serviced.

We claim:

1. Apparatus for supplying a fluid medium under pressure, said apparatus comprising:

a container for holding the fluid medium and having first and second openings therein;

a valve member movable back and forth in one direction within said container to a first position to seal both of said openings and to a second position to open said first opening, said valve having a pressure surface communicating with the fluid medium for producing a force in response to the pressure of the fluid tending to move said valve to said second position;

an inertia responsive mass engaging said valve member and movable in substantially the same direction as said valve member, said mass being movable to an actuated position in response to not less than a predetermined rate of change of velocity of said container; and stop means engaging said mass for locking said valve member in said first position, said means being responsive to actuation of said mass to release said valve member and to lock said mass in said actuated position.

2. Apparatus according to claim 1, wherein said valve member is of hollow cylindrical construction normally extending from said second opening into said first opening, and wherein said inertia responsive mass is positioned within said valve member.

3. Apparatus according to claim 2 wherein said second opening is of larger diameter than said first opening and said valve member is enlarged at said second opening.

4. Apparatus according to claim 3 wherein said inertia responsive mass is movable parallel to said valve member between a first position and said actuated position.

5. Apparatus according to claim 4 including spring means for biasing said mass toward said first position.

6. Apparatus according to claim 5 wherein said container is provided with a neck at said second opening and wherein said stop means includes a cage member secured to said neck and a movable member restrained by said cage member against axial movement with respect to said valve member, said movable member having a locking position engaging said valve member and an unlocking position out of engagement with said valve member.

7. Apparatus according to claim 6 wherein said movable locking member is held in said locking position by said mass when said mass is in said first position and is moved into said unlocking position by said valve member when said mass moves to said actuated position.

8. Apparatus according to claim 7, wherein said valve member is provided with a recess to receive said movable locking member only in said locking position and said mass is provided with a recess to receive said movable locking member in said unlocking position for locking said mass in said actuated position.

9. Apparatus according to claim 8, wherein said mass is provided with shoulder means facing said cage member and said spring means is a coil spring engaging said shoulder means and said cage member.

10. Apparatus according to claim 9 wherein said cage member is provided with an axial extending bore and wherein a screw member extends through said bore and is threaded into said mass, said screw member having a head contacting said cage member so that rotation of said screw member changes said first position of said mass relative to said cage member to adjust the force exerted by said spring.

* * * * *